United States Patent [19]

Testa

[11] Patent Number: 5,231,782

[45] Date of Patent: Aug. 3, 1993

[54] FISHING ROD GRIPPING ASSEMBLY

[76] Inventor: Thomas J. Testa, 36 Sunnyfield Dr., Windsor, Conn. 06095

[21] Appl. No.: 893,199

[22] Filed: Jun. 2, 1992

[51] Int. Cl.$^5$ .............................................. A01K 87/00
[52] U.S. Cl. .................................................... 43/18.1
[58] Field of Search .................... 43/18.1, 18.5, 23, 25

[56] References Cited

U.S. PATENT DOCUMENTS

| | | | |
|---|---|---|---|
| 2,559,934 | 7/1951 | Briney | 43/18.1 |
| 2,653,406 | 9/1953 | Grabiak | 43/25 |
| 3,121,290 | 2/1964 | Brown | 43/18.1 |
| 3,415,002 | 12/1968 | Schaefer | 43/18.1 |
| 4,041,635 | 8/1977 | Savage | 43/25 |
| 4,130,960 | 12/1978 | Fontenot | 43/18.1 |
| 4,162,587 | 7/1979 | Dethlefs | 43/18.1 |

Primary Examiner—Richard K. Seidel
Assistant Examiner—Jeanne M. Elpel
Attorney, Agent, or Firm—Fishman, Dionne & Cantor

[57] ABSTRACT

A gripping device for use with fishing poles comprises an angled gripping member with a connection at each end adapted for connection between the rod and butt portions of a fishing pole. The gripping member is angled relative to the rod and butt which are themselves in alignment.

16 Claims, 3 Drawing Sheets

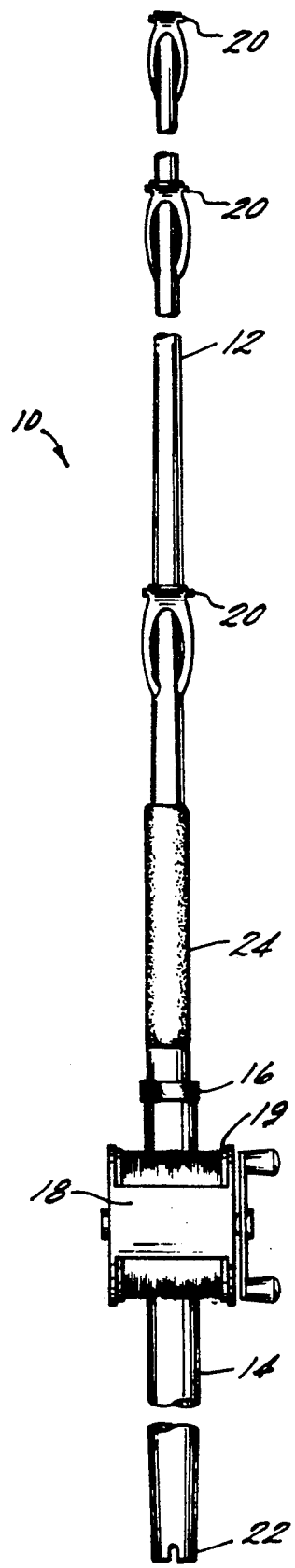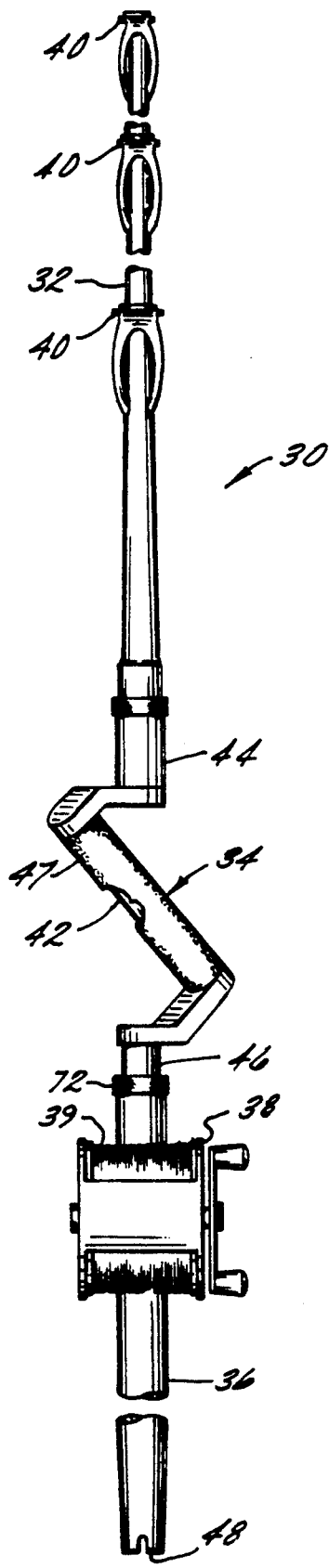
FIG. 1
(PRIOR ART)
FIG. 2

FISHING ROD GRIPPING ASSEMBLY

BACKGROUND OF THE INVENTION invention relates to fishing poles. More particularly, the present invention relates to a novel grip for fishing poles of the type commonly used for deep sea fishing.

Deep sea fishing poles are well known. The fishing poles generally comprise a rod, a butt (i.e., a lower portion), a reel housing and a reel assembly. The reel assembly includes a line which is guided along the rod by a plurality of eyelets mounted to the rod. The reel assembly is secured in the reel housing which is located at the upper end of the butt. Generally, the rod is connected to the butt by a rotary connection.

During use the lower end of the butt is held in a gimble which prohibits twisting of the pole while allowing a back and forth movement. The gimble is generally affixed to a fishing chair on a boat or can be affixed elsewhere on the boat for stand-up fishing. With a right hand reel assembly the pole is gripped at the lower end of the rod above the reel with the left hand and the reel assembly is operated with the right hand. Accordingly, this back and forth movement of the pole is controlled with the left hand. The butt and the rod form a single continuous generally cylindrical shape (i.e., that of a pole as is well known). This requires the left hand to grip the pole in a linear fashion. The left arm (i.e., in the case of a right hand reel assembly) tends to become fatigued as a result of this back and forth motion. This is due to the fact that much of this movement is done by the lower arm muscles (e.g., the forearm muscles). Accordingly, a need exists for an improved fishing pole which would reduce this fatigue factor.

SUMMARY OF THE INVENTION

The above discussed and other problems and deficiencies of the prior art are overcome or alleviated by the gripping device of the present invention. In accordance with the present invention, the gripping device is connected between the rod and the butt of a fishing pole commonly used for deep sea fishing. In the preferred embodiment of the present invention, the rod is shortened to accommodate the gripping device without significantly extending the overall length of the fishing pole.

The gripping device comprises an angled gripping member with a connector at each end adapted for connect to the rod and the butt of the pole. The gripping member is angled relative to the rod and butt which are themselves in alignment. The gripping member may be padded. Further, in an alternate embodiment this gripping member is allowed to rotate (i.e., journal) relative to the connectors.

During use of the present invention, again for purpose of illustration with a right hand reel assembly, the pole is gripped at the gripping member, whereby the left hand is at an angle relative to the rod and butt. This angle is approximately 45° and in a slightly forwardly direction relative to the rod and butt. The back and forth movement with the hand in this position concentrates the force on the upper arm muscles which tend to be significantly stronger than the lower arm muscles. This results in a significant reduction in the fatigue of the left arm. Also, more power is available to pull a fish in with the hand in this position.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 1 is a front elevational view of a fishing pole in accordance with the prior art;

FIG. 2 is a perspective view of a fishing pole employing the gripping device in accordance with the present invention;

DESCRIPTION OF THE PREFERRED EMBODIMENT

Figure 4:
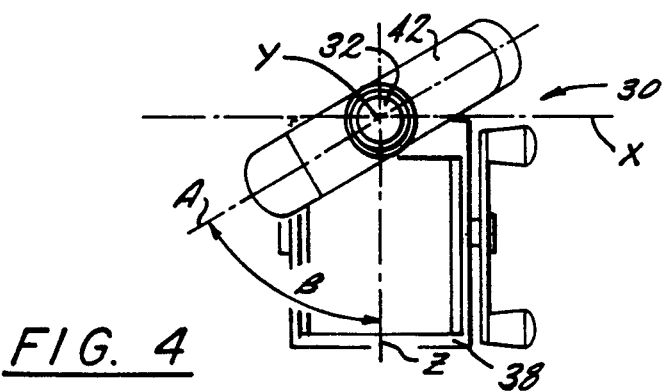
FIG. 4 is a top diagramatic view of the fishing pole and gripping device of FIG. 2.

Referring to FIG. 1 a fishing pole in accordance with the prior art is shown generally at 10. Pole 10 comprises a rod portion 12 attached to a butt portion 14. Rod 12 and butt 14 are normally connected by a rotary connection 16 (e.g., a collet nut). Rotary connection 16 generally comprises a male rotary connection on the end of butt 14 and a female connecting sleeve retained at the mating end of rod 12. A reel housing 18 is secured to butt 14. Reel housing 18 is receptive to a reel assembly 19 including a line which is guided along rod 12 by a plurality of eyelets 20 mounted to rod 12.

During use of pole 10 the lower end 22 is held in a gimble (not shown) which prohibits twisting of pole 10 while allowing a back and forth movement. With right hand reel assembly 19 pole 10 is gripped at the lower end of rod 12 about a straight grip 24 with the left hand while reel assembly 19 is operated by the right hand.

The back and forth movement of pole 10 is controlled by the left hand. Accordingly, the left hand will be gripping pole 10 in a linear fashion. The left arm (with right hand reel assembly 19) tends to become fatigued as a result of the back and forth movement. This is due to the fact, that most of this movement is done by the lower arm muscles (e.g., the forearm muscles).

Figure 3:
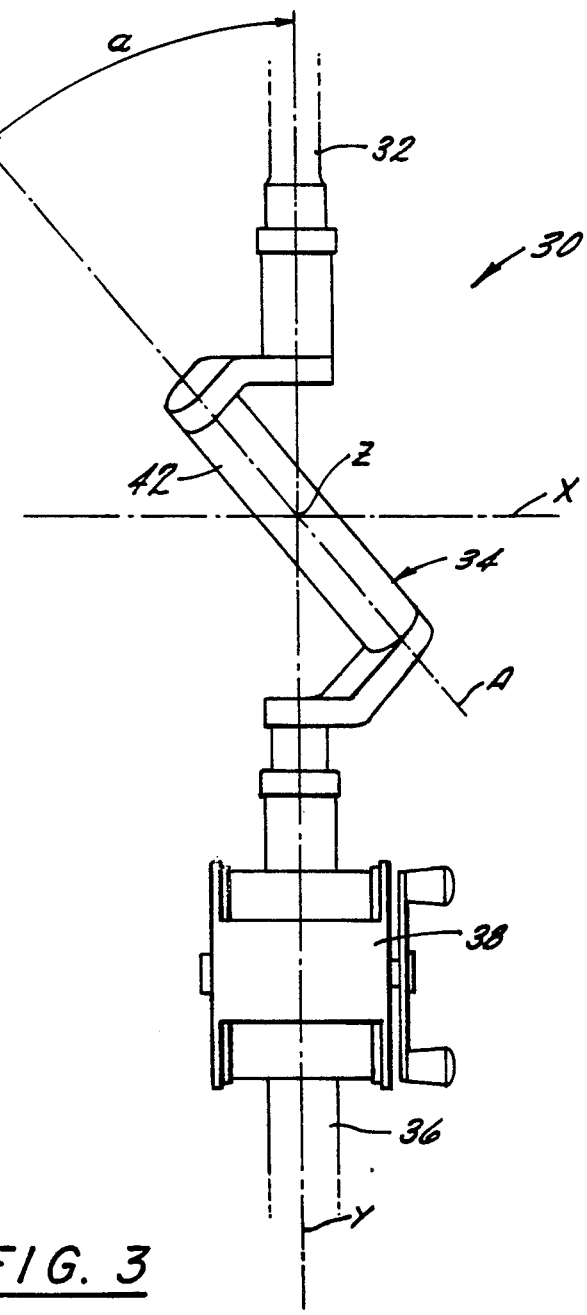
FIG. 3 is a front diagramatic elevational view of the fishing pole and gripping device of FIG. 2.
Figure 8:
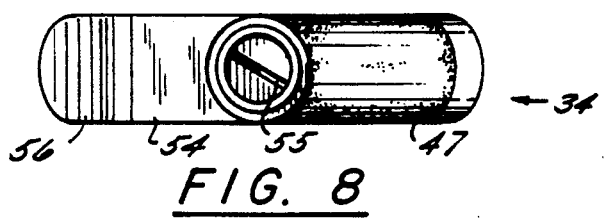
FIG. 8 is a top view of the gripping device of FIG. 5.
Figures 5, 6, 7:
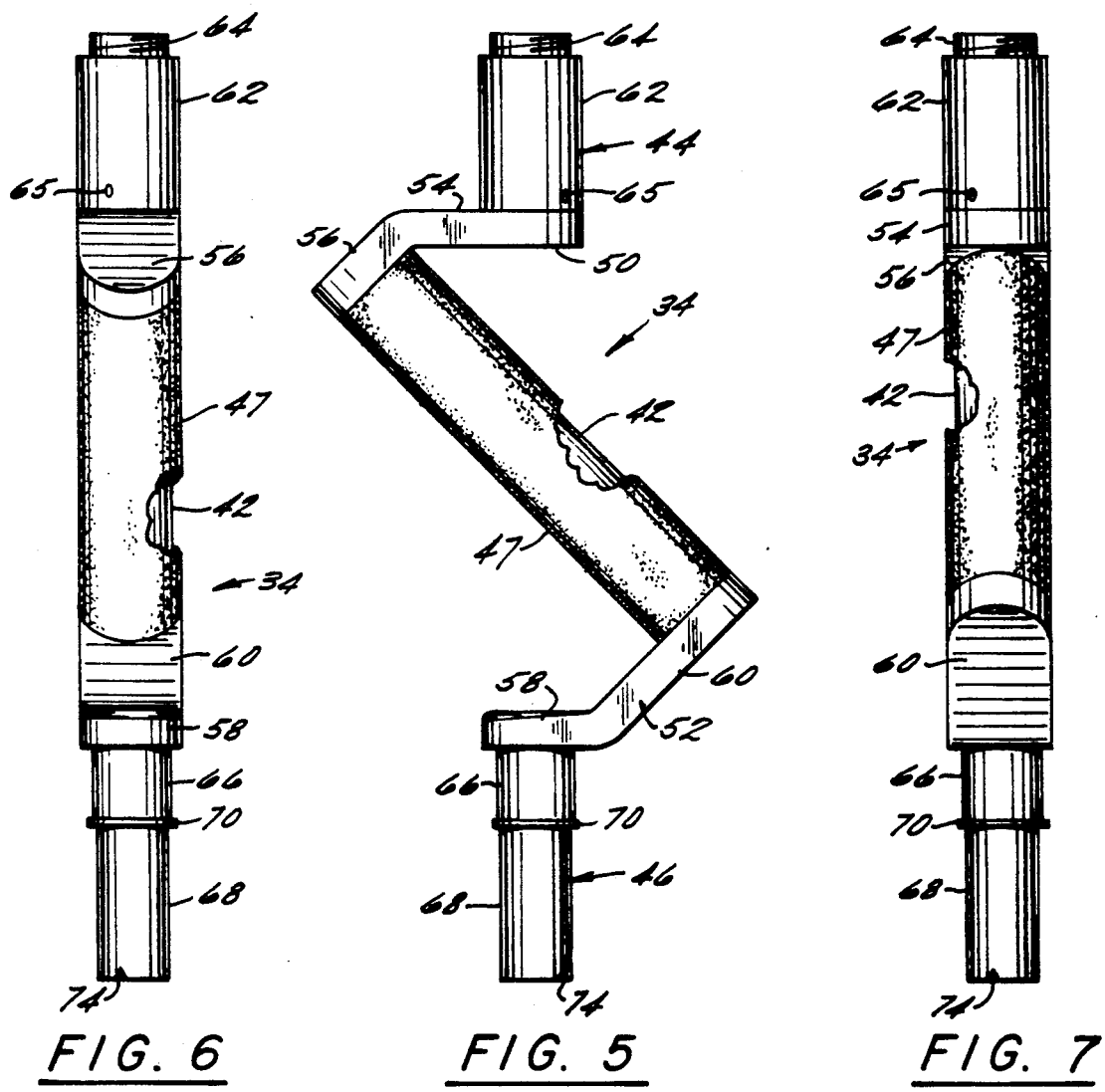
FIG. 5 is a front elevational view of the gripping device in FIG. 2.
FIG. 6 is a left side elevational view of the gripping device of FIG. 5.
FIG. 7 is a right side elevational view of the gripping device of FIG. 5.
Figure 9:
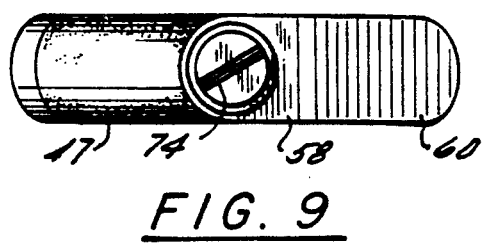
FIG. 9 is a bottom view of the gripping device of FIG. 5.

Referring now to FIGS. 2-4 where a fishing pole in accordance with the present invention is shown generally at 30. Pole 30 comprises a rod portion 32 connected to angled gripping means 34 which is then connected to a butt portion 36. A reel housing 38 is secured to butt 36. Reel housing 38 is receptive to a reel assembly 39 including a line which is guided along rod 32 by a plurality of eyelets 40 mounted on rod 32. Gripping means 34 comprises an angled gripping member 42 having a connector 44 and a connector 46 at corresponding ends for connection to rod 32 and butt 36 respectively. Also, it is preferred that member 42 include a padded grip or cover 47 thereabout.

Gripping member 42 has a central axis A longitudinally therethrough. Rod 32 and butt 36 are in alignment and have a central axis Y. Alignment is defined herein as the eyelets 40 being disposed directly vertically above the reel housing 38, as this is a well known standard configuration for fishing poles. Also, axis X and Z are provided to aid in the illustration of the angular displacement of angular member 42. Both axis X and Z are perpendicular to axis Y and each is perpendicular to the other. Axis X is parallel to an axis (not shown) passing longitudinally through the center of reel housing 38. Gripping member 42 is angled in two directions relative to the rest of pole 30 (i.e., rod 32 and butt 36). The axis A is at an angle α with respect to the axis Y. The angle α is preferably about 45°. However, any angle within a range from about 20° to less than 90° will suffice. Further, axis A is at an angle β with respect to the axis Z. The angle β is preferably about 30°. However, any angle within a range from about 0° to about 80° will suffice.

During use of pole 30 the lower end 48 is held in a gimble (not shown) which prohibits twisting of pole 30 while allowing a back and forth motion, as is known. With right hand reel assembly 39, pole 30 is gripped at gripping means 34, more specifically, at gripping member 42, with the left hand while reel assembly 39 is operated by the right hand.

The back and forth movement of pole 30 is controlled by the left hand (as was also the case with the prior art poles). However, unlike the prior art, the left hand will be gripping pole 30 in an angular fashion. The prior art poles (described hereinbefore) were gripped in a linear fashion. The back and forth movement with the hand in the angled position, in accordance with the present invention, concentrates the force on the upper arm muscles which tend to be significantly stronger than those of the lower arm. Accordingly, the device of the present invention results in a significant reduction in the fatigue of the left arm, due to this back and forth movement. Also, more power is available to pull a fish in with the hand in this position. Although, a right hand reel assembly 39 has been described these concepts are equally applicable to a left hand reel assembly.

Referring also to FIGS. 5-8 angled gripping means 34 is shown. Gripping means 34 comprises an angled gripping member 42 and connectors 44 and 46. Member 42 is preferably a cylindrical rod being attachable at each end to angled bracket members 50 and 52. Bracket 50 comprises a portion 54 with a portion 56 extending generally downwardly and outwardly therefrom. Portion 56 is attached to member 42 by any well known means (e.g., pinned or welded). Bracket 52 comprises a portion 58 with a portion 60 extending generally upwardly and outwardly therefrom. Portion 60 is attached to the other end of member 42 by similar means. These brackets define the angle α described hereinbefore.

Portion 54 is attached to connector 44 by any well known means described hereinbefore. Connector 44 comprises a cylindrical member 62 with a male rotary connector 64 at one end thereof. A pin 65 is provided to align rod 32 by mating a corresponding channel at the lower end of rod 32 (as is known) which is inserted within member 62.

Portion 58 is attached to connector 44 by any well known means described hereinbefore. Connector 44 comprises a first cylindrical portion 66 and a second cylindrical portion 68. An annular ring 70 separates portions 66 and 68. A female rotary connector sleeve 72 (FIG. 2), (e.g. a collet nut) is retained about section 66 by ring 70. Portion 68 comprises a smaller diameter than portion 66 to allow insertion of portion 68 into an open end of butt 36. A channel 74 at the lower end of portion 68 mates with a pin in the open end of butt 36 (as is known). The mating of pin 65 with the channel at the lower end of rod 32 defines the angle β described hereinbefore. The mating of channel 74 with the pin in the open end of butt 36 also defines this angle β. Further, rod 32 and butt 36 are maintained in alignment (as described hereinbefore) by the above. The butt and rod portions of the prior art poles are aligned by the same well known method.

Although, gripping means 34 has been described as comprising separate elements it may be comprised of a single continuous piece provided the above defined angular relationships are maintained. Further, although gripping means 34 and butt 36 have been described as comprising separate elements they may be comprised of a single continuous piece provided the above defined angular relationships are maintained. While member 42 has been described as being fixedly attached to brackets 52 and 54, member 42 may be attached to allow member 42 to rotate (e.g., journal) between brackets 52 and 54.

Further, it is preferred that rod 32 be shortened so that overall length of pole 30 is generally the same as the prior art poles.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A fishing pole, comprising:
   a rod portion;
   means for guiding a line along said rod portion, said means for guiding being disposed on said rod portion;
   reel housing means being receptive to a reel assembly for reeling the line, said reel housing means being generally aligned with said means for guiding whereby said means for guiding is disposed above said reel housing means;
   a butt portion having said reel housing means disposed thereon; and
   angled gripping means having first and second ends, said first end connected to one end of said rod portion and said second end connected to one end of said butt portion, wherein said angled gripping means includes a gripping member connected between said rod portion and said butt portion in a predetermined angular relationship, said gripping member having grip means thereon.

2. The fishing pole of claim 1 wherein said angular relationship comprises:
   a first angle lying between an axis Y along the length of said pole and an axis A along the length of said gripping member.

3. The fishing pole of claim 2 wherein said first angle is about 45°.

4. The fishing pole of claim 2 wherein said angular relationship further comprises:
   a second angle lying between an axis Z and said axis A, said axis Z being perpendicular to said axis Y and perpendicular to an axis X, said axis X being parallel to an axis passing longitudinally through about the center of said reel housing means.

5. The fishing pole of claim 4 wherein said second angle is about 60°.

6. The fishing pole of claim 4 wherein:
said gripping member having first and second ends; and
means for attaching said first and second ends of said gripping member to said rod portion and said butt portion respectively, wherein said means for attaching defines said first and second angles.

7. The fishing pole of claim 6 wherein said means for attaching said first and second ends of said gripping member comprises:
first and second bracket members being attached to corresponding first and second ends of said gripping member, said first bracket member having a first portion and a second portion extending generally downwardly and outwardly from said first portion, said second bracket member having a first portion and a second portion extending generally upwardly and outwardly from said first portion, said second portion of said first bracket member being attached to said first end of said gripping member, said second portion of said second bracket member being attached to said second end of said angled gripping member, wherein said first and second bracket members support said gripping member at said first angle, said first portion of said first bracket member including means for attachment to said rod portion, said first portion of said second bracket member including means for attachment to said butt portion, wherein said means for attachment to said rod portion and said means for attachment to said butt portion define said second angle.

8. The fishing pole of claim 7 wherein said means for attachment to said rod portion comprises:
a first generally cylindrical member extending upwardly from said first portion of said first bracket member, said first cylindrical member for insertion into one end of said rod portion; and
a male rotary connector disposed at one end of said first cylindrical member for connection to said rod portion;
a pin extending through said first cylindrical member to define said second angle relative to said rod portion; and
wherein said means for attachment to said butt portion comprises:
a second generally cylindrical member extending downwardly from said first portion of said second bracket member;
annular ring disposed between upper and lower portions of said second cylindrical member, said lower portion of said second cylindrical member for insertion into one end of said butt portion;
a notch formed in one end of said second cylindrical member to define said second angle relative to said butt portion; and
a female rotary connector sleeve retained about said first portion of said cylindrical member by said annular ring, said rotary connector sleeve for connection to said butt portion.

9. The fishing pole of claim 1 wherein said grip means is a pad.

10. The fishing pole of claim 1 wherein said angled gripping means is fixed.

11. The fishing pole of claim 1 wherein said angled gripping means is journalled.

12. A fishing pole, comprising:
a rod portion;
means for guiding a line along said rod portion, said means for guiding being disposed on said rod portion;
reel housing means being receptive to a reel assembly for reeling the line, said reel housing means being generally aligned with said means for guiding whereby said means for guiding is disposed above said reel housing means;
a butt portion having said reel housing means disposed thereon;
gripping means having first and second ends, said first end connected to one end of said rod portion and said second end connected to one end of said butt portion, wherein said gripping means is connected between said rod portion and said butt portion in a predetermined angular relationship;
wherein said angular relationship comprises a first angle lying between an axis Y along the length of said pole and an axis A along the length of said gripping means; and
wherein said angular relationship further comprises a second angle lying between an axis Z and said axis A, said axis Z being perpendicular to said axis Y and perpendicular to an axis X, said axis X being parallel to an axis passing longitudinally through about the center of said reel housing means.

13. The fishing pole of claim 12 wherein said second angle is about 60°.

14. The fishing pole of claim 12 wherein said gripping means comprises:
a gripping member having first and second ends; and
means for attaching said first and second ends of said gripping member to said rod portion and said butt portion respectively, wherein said means for attaching defines said first and second angles.

15. The fishing pole of 14 wherein said means for attaching said first and second ends of said gripping member comprises:
first and second bracket members being attached to corresponding first and second ends of said gripping member, said first bracket member having a first portion and a second portion extending generally downwardly and outwardly from said first portion, said second bracket member having a first portion and a second portion extending generally upwardly and outwardly from said first portion, said second portion of said first bracket member being attached to said first end of said gripping member, said second portion of said second bracket member being attached to said second end of said gripping member, wherein said first and second bracket members support said gripping member at said first angle, said first portion of said first bracket member including means for attachment to said rod portion, said first portion of said second bracket member including means for attachment to said butt portion, wherein said means for attachment to said rod portion and said means for attachment to said butt portion define said second angle.

16. The fishing pole of claim 15 wherein said means for attachment to said rod portion comprises:
a first generally cylindrical member extending upwardly from said first portion of said first bracket member, said first cylindrical member for insertion into one end of said rod portion; and
a male rotary connector disposed at one end of said first cylindrical member for connection to said rod portion;

a pin extending through said first cylindrical member to define said second angle relative to said rod portion; and wherein said means for attachment to said butt portion comprises:

a second generally cylindrical member extending downwardly from said first portion of said second bracket member;

an annular ring disposed between upper and lower portions of said cylindrical member, said lower portion of said second cylindrical member for insertion into one end of said butt portion;

a notch formed in one end of said second cylindrical member to define said second angle relative to said butt portion; and a female rotary connector sleeve retained about said first portion of said cylindrical member by said annular ring, said rotary connector sleeve for connection to said butt portion.

* * * * *